United States Patent [19]

Furukawa

[11] Patent Number: 4,901,855
[45] Date of Patent: Feb. 20, 1990

[54] ROLL CARGO TRANSPORTATION CONTAINER AND APPARATUS FOR PREVENTING ROLL CARGO FROM DIVERGENCE OF ROLL CORE

[76] Inventor: Shigenobu Furukawa, 7-10, Tsuboi 3-chome, Ondo-cho, Aki-gun, Hiroshima, 737-12, Japan

[21] Appl. No.: 278,009

[22] Filed: Nov. 30, 1988

[30] Foreign Application Priority Data

Nov. 30, 1987 [JP] Japan .................................. 62-303779
Mar. 3, 1988 [JP] Japan .................................. 63-50000
Jun. 17, 1988 [JP] Japan ............................ 63-81068[U]

[51] Int. Cl.⁴ ............................................. B65D 85/66
[52] U.S. Cl. .................................. 206/389; 206/446; 220/1.5
[58] Field of Search ............... 206/386, 389, 443, 446; 220/1.5

[56] References Cited

U.S. PATENT DOCUMENTS

| | | | |
|---|---|---|---|
| 3,726,431 | 4/1973 | Botkin | 206/446 |
| 3,835,986 | 9/1974 | LeBeau | 206/446 |
| 3,889,831 | 6/1975 | Davis | 206/389 |
| 4,027,794 | 6/1977 | Olson | 206/446 |
| 4,151,914 | 5/1979 | Blatt | 206/386 |
| 4,401,217 | 8/1983 | Blatt | 206/386 |
| 4,732,528 | 3/1988 | Good | 206/389 |
| 4,805,794 | 2/1989 | Tsuchiya et al. | 206/389 |
| 4,826,015 | 5/1989 | Mandel | 206/386 |

Primary Examiner—Jimmy G. Foster
Attorney, Agent, or Firm—Beveridge, DeGrandi & Weilacher

[57] ABSTRACT

Disclosed is a novel roll-cargo transporting container which securely holds roll cargo in position by provision of sliding frame member below the top frame member and by effect of bracket members set to the bottom frame member and sliding frame member.

12 Claims, 23 Drawing Sheets

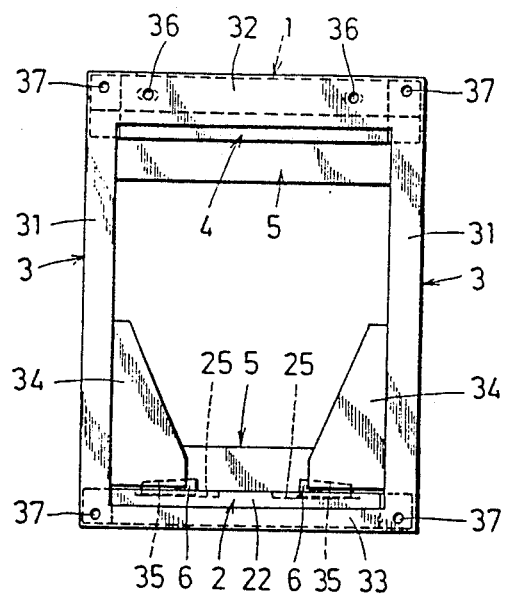
Fig. 3
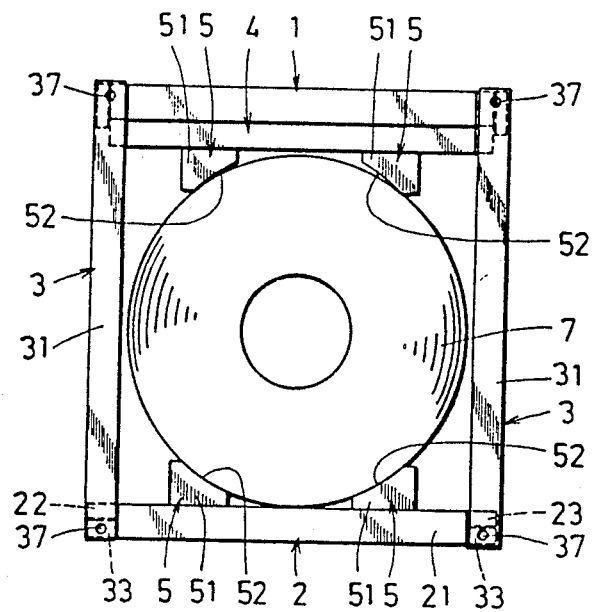
Fig. 4-A

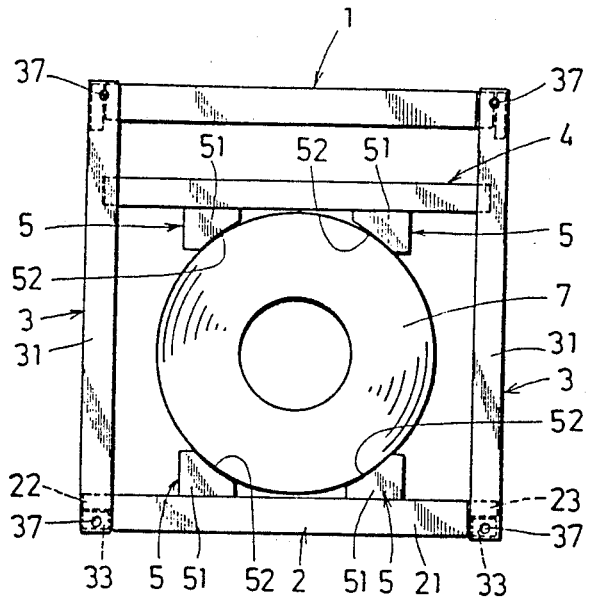
Fig.4-B
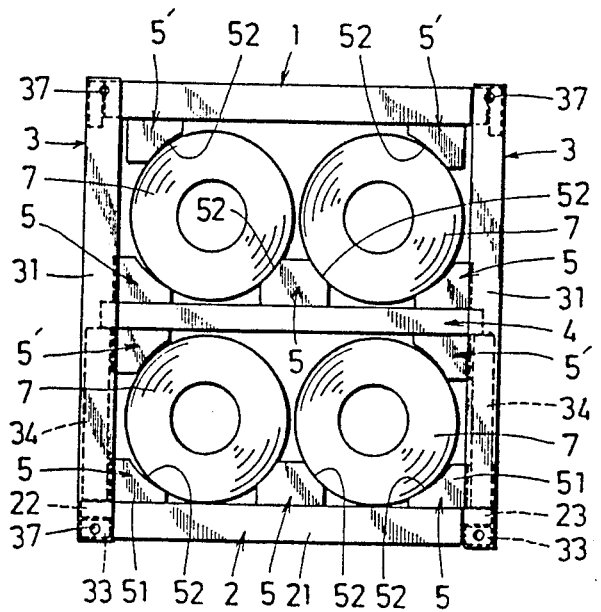
Fig.4-C

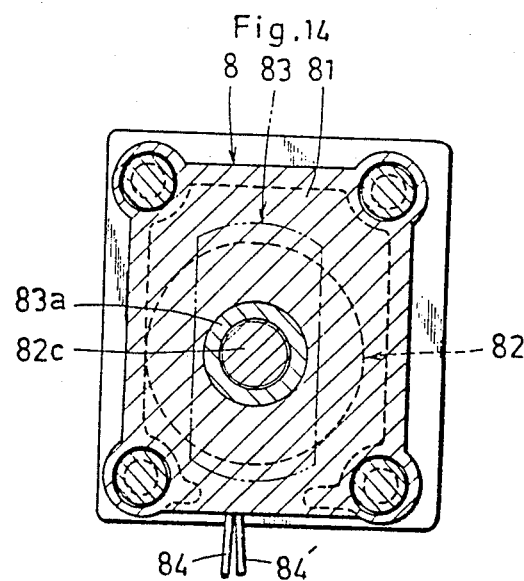
Fig.14
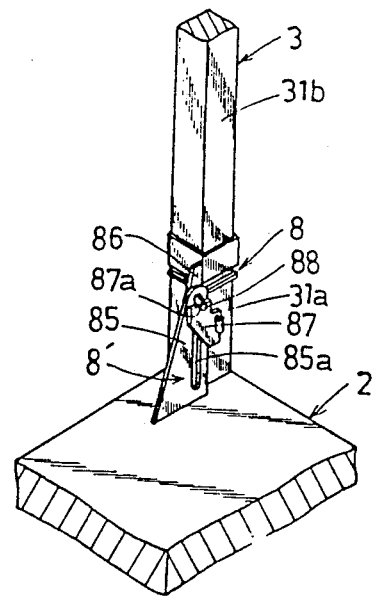
Fig.15-A

Fig.15-B
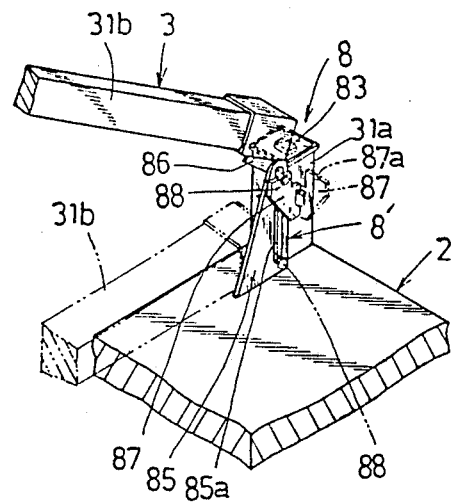
Fig.16
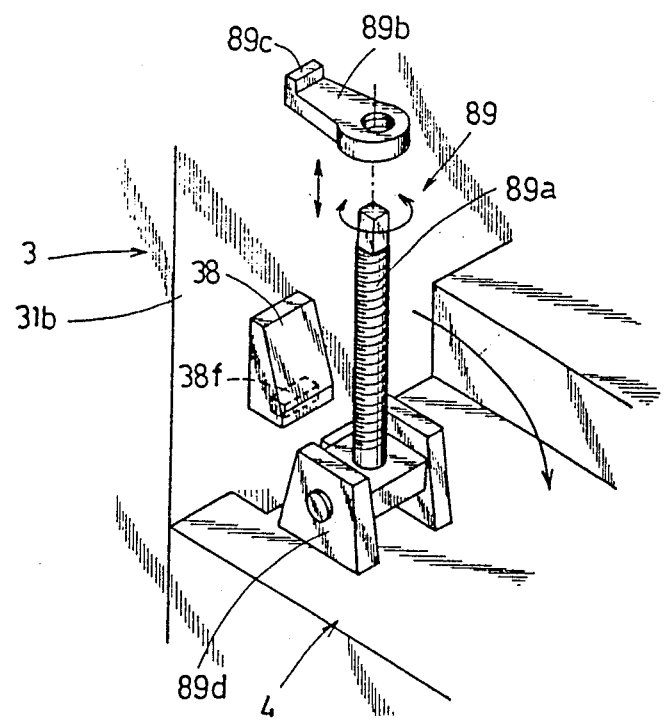

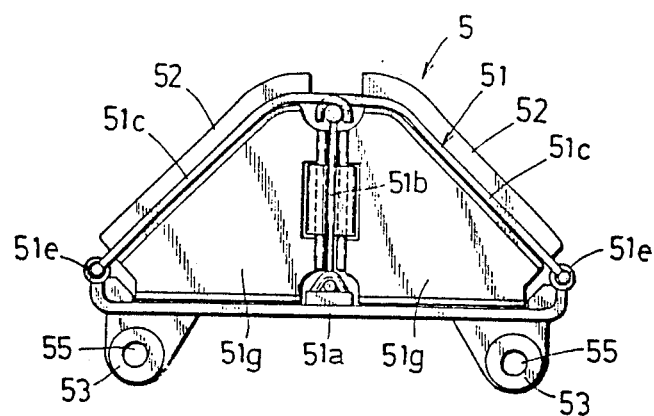
Fig.21-A
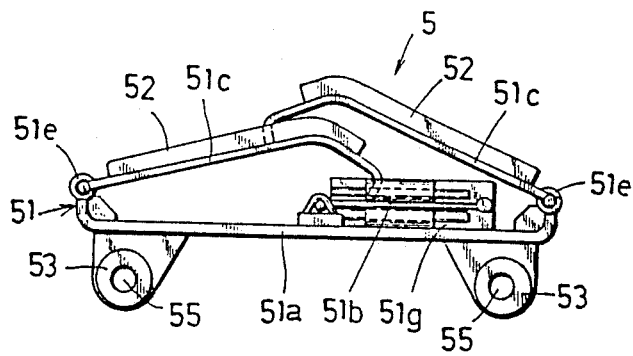
Fig.21-B
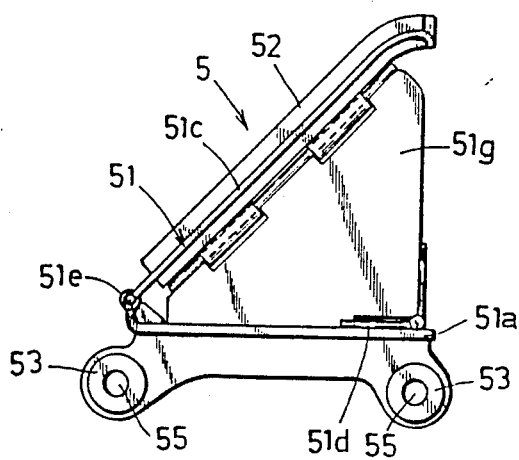
Fig.22

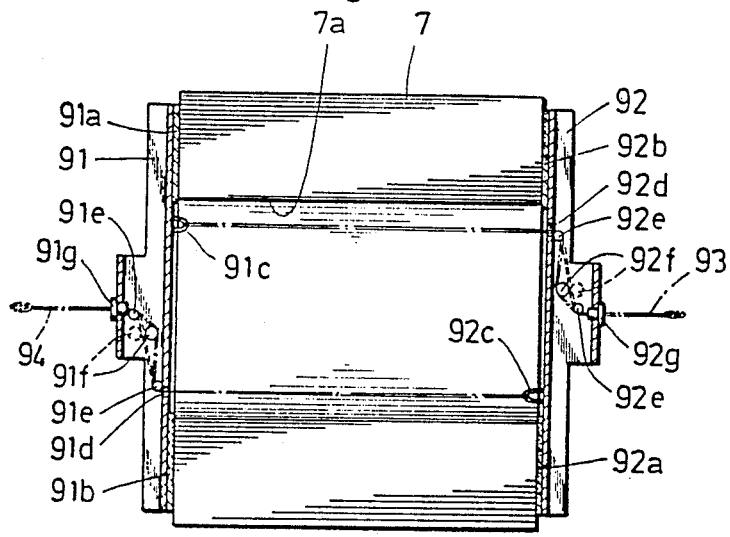
Fig.29
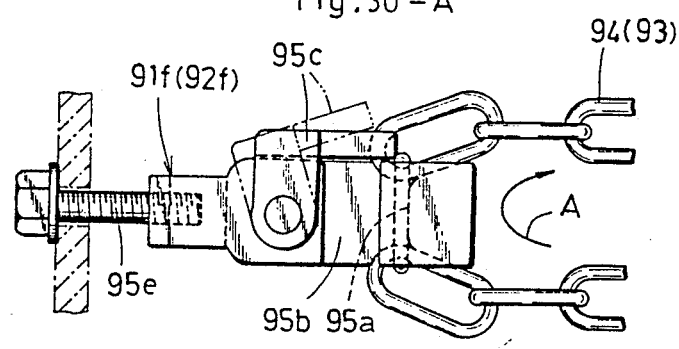
Fig.30-A
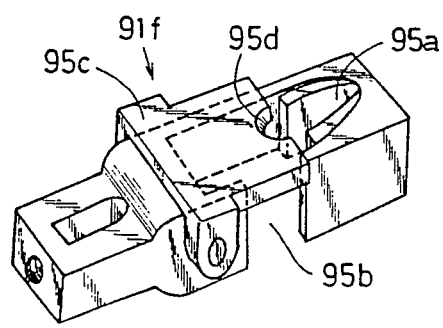
Fig.30-B

ROLL CARGO TRANSPORTATION CONTAINER AND APPARATUS FOR PREVENTING ROLL CARGO FROM DIVERGENCE OF ROLL CORE

BACKGROUND OF THE INVENTION

1. Field of the Invention

The present invention relates to a container for transporting roll cargo and an apparatus for preventing roll cargo from incurring divergence of roll core on the way of transportation, more particularly, to a novel container for transporting roll cargo and a novel apparatus which prevents roll cargo from incurring divergence of roll core from the original condition taking place on the way of sea/land transportation.

2. Description of the Related Art

Of a variety of steel materials exported from Japan for example, majority of hot coils are delivered to general iron works, and thus, these hot coils have sizable thickness. On arrival at processing factories of the imported country, these hot coils are sheared into predetermined length or rerolled before eventually being delivered to markets.

Now, looking at the method of transporting hot coils having sizable thickness, unit weight is variable according to the shape and dimension. Normally, hot coils are handled by transportation specialists as heavy cargo. In many cases, hot coils are shipped on a conventional freight vessel at a specially installed quay of a steel mill by applying special cranes. Any conventional freight vessel transports a huge bulk of hot coils in the condition preventing them from breaking loose by heavily binding them with lumber dunnage, wedges, chocks, and wires, while directly stacking hot coils on double-bottomed deck inside of the hold in multiple rows and layers. Normally, unit weight of each hot coil is quite heavy and often exceeds the allowable loading capacity of any conventional container, and thus, actually, hot coils are not transported by any container failing under ISO standard.

On the other hand, recently, export of complete coils made from sheets from Japan increases, which are typically used for manufacturing automotive parts in local factories of the imported country. These complete coils are directly delivered to press work of the automotive part manufacturing line without being reprocessed by local factories, i.e., in the ex-Japanese factory condition. It is therefore extremely important for those who are responsible for the transportation to thoroughly safeguard the shipped hot coils from incurring deformation and/or damage caused by breakdown of cargo on the way of transportation or by careless loading and unloading operations or by adverse effect of binding members.

On the other hand, local factories on the part of the imported country are not always at a site close to harbors, but in many cases, these are located in the inland areas. As a result, complete hot coils are subject to overland transportation until arrival at the designated local factory via trucks or freight trains after unloading them from the freight vessel at the port. Therefore, it is very important for those being in charge of transportation to carefully protect the complete sheet coils from incurring deformation and/or damage on the way of overland transportation.

More particularly, when transporting complete sheet coils by means of a freight vessel, these coils are directly stacked in multiple rows and layers in the hold. Consequently, complete sheet coils are subjected to heavy-weight pressure generated by multiple-layer stack, while they are also subjected to lateral pressure generated by rolling and pitching of the freight vessel itself. In addition, the roll cargo is subjected to repeated loading and unloading processes on the way of distribution and also to additional load generated by binding apparatus. As a result, shape of the roll cargo is frequently deformed and cargo itself also incures substantial damage Since overland transportation must be executed in many cases, those accidents can take place more frequently.

Taking those critical problems into consideration, the inventor tried to materialize transportation of sheet-coils or wire coils (hereinafter merely called hot coils as a whole) by storing them in an ISO standard container. Nevertheless, it became clear for the inventor that, if hot coils were merely stored inside of the ISO container, external force against the freight vessel or train adversely affects loaded hot coils, thus causing them to displace inside of the container, and then, hot coils might be subjected to unexpected pressure enough to deform these coils, or friction might be generated between the loaded hot coils to result in the grave damage. In the light of those critical problems mentioned above, the inventor could not materialize the aimed object for a long while. Furthermore, since hot coils are prepared in a variety of forms for shipment and there are substantial differences in the dimension and weight of these coils, the constitution of the container itself needs to be compatible with a wide variety of hot coils. Consequently, it was quite difficult for the inventor to devise practical art for achieving the aimed object.

Not only hot coils, there were similar problems in the transportation of roll papers available for newspaper etc.

SUMMARY OF THE INVENTION

The primary object of the invention is to provide a novel container suited for transporting roll cargo.

Another object of the invention is to securely prevent cargo from incurring even the slightest deformation and/or damage on the way of sea and/or overland transportation.

Another object of the invention is to provide a novel container which is compatible with a variety of dimensions of roll cargo.

Another object of the invention is to provide a novel container which can be folded into a flat and non-bulky configuration when being collected.

A still further object of the invention is to provide means for preventing roll cargo from incurring divergence of the core of rolled material from the original condition on the way of transportation.

Now, therefore, in order to securely achieve those objects mentioned above, the roll-cargo transporting container related to the invention features provision of the following:

top frame member which is removably installed between the top edges of main pillar frame members erected on four corners of the bottom frame member;

sliding frame member which slides itself in the vertical direction in a range corresponding to upper half of the main pillar frame members; and a plurality of slidable bracket members having arc-shaped surfaces which come into contact with hot coils, where these bracket members are slidably installed above the surface of the bottom frame member and below the surface of sliding frame member;

Desirably, the main pillar frame members should be of square shape. It is more desirable that the main pillar frame members are respectively provided with inwardly oriented projections on their surfaces where main pillars face each other, and furthermore, it is desirable that the main pillar frame members are provided with wedges which integrally combine the bottom frame member with the main pillar frame members by being inserted between the edge portions of the bottom frame member and the inward projections.

It is more desirable that the main pillar frame members are erected and diassembled in the manner of falling themselves flat on the bottom frame member, and yet, it is also desirable that the bottom frame member has auxiliary frame members which are erected when the main pillar frame members remain flat on the bottom frame member.

Furthermore, it is also desirable that bracket members are removably installed to the upper surface of the sliding frame member.

To constitute the roll cargo transporting container related to the invention, the top frame member is removably installed between the upper edges of the main pillar frame members erected on four corners of the bottom frame member, and in addition, sliding frame member is installed in a range corresponding to upper half of the main pillar frame members so that it can slide itself in the vertical direction, and yet, arc-shaped surfaces are formed on the upper surface of the bottom frame member and the bottom surface of the sliding frame member to allow bracket members to slide themselves. Those constituents allow bracket members to slide themselves in accordance with external diameter of roll cargo before storing roll cargo in this condition and stably support roll cargo inside of the container by sliding the sliding frame member so that bracket members can come into contact with the surface of roll cargo.

The apparatus for preventing roll cargo from incurring divergence of the core of rolled material from the original state features provision of the following; a pair of lengthy rigid bodies which are respectively longer than the inner diameter and shorter than the outer diameter of roll cargo and fixed along both end surfaces of roll cargo; and a pair of connection members connecting the pair of lengthy rigid bodies through the inner space of roll cargo.

It is desirable that buffer layers are integrally formed on the external surfaces of the pair of lengthy rigid bodies for coming into contact with roll cargo. The buffer layers should be provided at least in a range coming into contact with edge surface of roll cargo. Alternately, buffer layers may also be provided all over the surfaces of lengthy rigid bodies.

Connection member is composed of a pair of leading chains. It is desirable that through-holes and mechanism for securing the pair of leading chains are provided in the center of each of lengthy rigid bodies. This mechanism may be of the one which thrusts leading chains or the one capable of performing seesaw-like operation.

As mentioned above, since the apparatus for preventing roll cargo from incurring divergence of the core of rolled material from the original position provides a pair of lengthy rigid bodies which are respectively longer than the inner diameter and shorter than the outer diameter of roll cargo and also a pair of connection members connecting the pair of lengthy rigid bodies through the inner space of roll cargo, the inner circumference of roll cargo can uniformly be controlled over a specific range in conjunction with the movement of roll cargo in the axial direction. As a result, when the external force is applied in the axial direction of roll cargo, amount of friction resistance at the border between the uniformly controlled portion and the outer portion outgrows that is generated on the innermost circumference of roll cargo, and thus, when certain external force less than substantial amount is applied to roll cargo, the apparatus related to the invention securely prevents the inner circumference of roll cargo from sliding in the axial direction.

The above and further objects and advantageous features of the invention will more fully be apparent from the detailed description and the accompanying drawings that follow.

BRIEF DESCRIPTION OF THE DRAWING

FIG. 3 is the lateral view of the roll cargo transporting container shown in FIG. 1;

FIG. 4 A through C are respectively the front views representing the state of storing roll cargo in the roll cargo transporting container related to the invention;

FIG. 13 is the vertical sectional view of essential constituents of connection members;

FIG. 14 is the vertical view of essential constituents of connection members shown in FIG. 12 taken on line XIV through SIV;

FIG. 15-A is the schematic perspective view of connection members and lay-down guide mechanism;

FIG. 15-B is the schematic perspective view of lay-down mechanism under operating condition;

FIG. 16 is the exploded perspective view of mechanism for preventing sliding frame member from moving upward;

FIGS. 21 and 22 are respectively the lateral view of bracket members having constituents other than those which are shown in FIGS. 17 through 20;

FIG. 29 is the sectional view of the apparatus shown in FIG. 28 laterally sectioned at the center;

FIG. 30-A is the lateral view of the cargo-supporting metal fitting;

FIG. 30-B is the perspective view of the metal fitting shown in FIG. 30-A;

DESCRIPTION OF THE PREFERRED EMBODIMENTS

Figure 1:
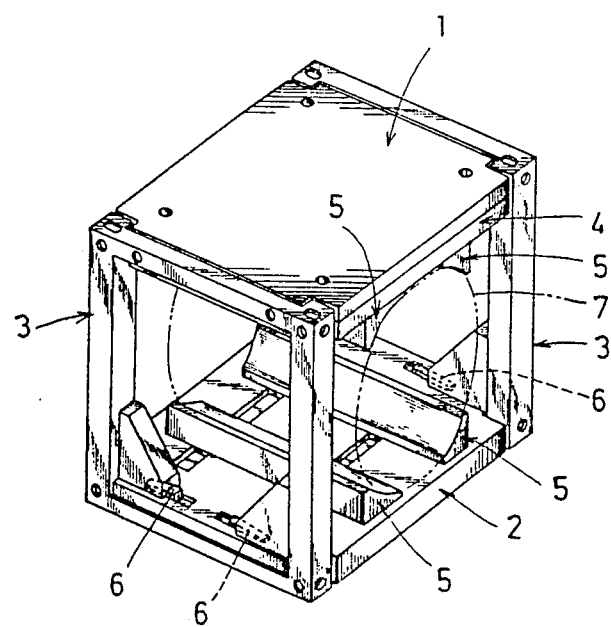
FIG. 1 is the perspective view of a preferred embodiment of the roll cargo transporting container related to the invention.

FIG. 1 is the perspective view of a preferred embodiment of the roll cargo transporting container related to the invention. The top frame member 1 and the bottom frame member 2 respectively having flatboard shape are disposed at the top and the bottom by maintaining a certain distance almost corresponding to the external diameter of roll cargo 7 having the largest dimensions. Square and hollow main pillar frame members 3 respectively connect lateral sides of the top and bottom frame members 1 and 2. Sliding frame member 4 is also provided, which slides itself throughout the upper-half range of the main pillar frame member 3. A pair of bracket members 5 are slidably and removably installed to the upper surface of the bottom frame member 2 and the bottom surface of the sliding frame member 4. In addition, another pair of bracket members 5' are removably installed to the bottom surface of the top frame member 1 and the bottom surface of the sliding frame member 4.

Figure 2:
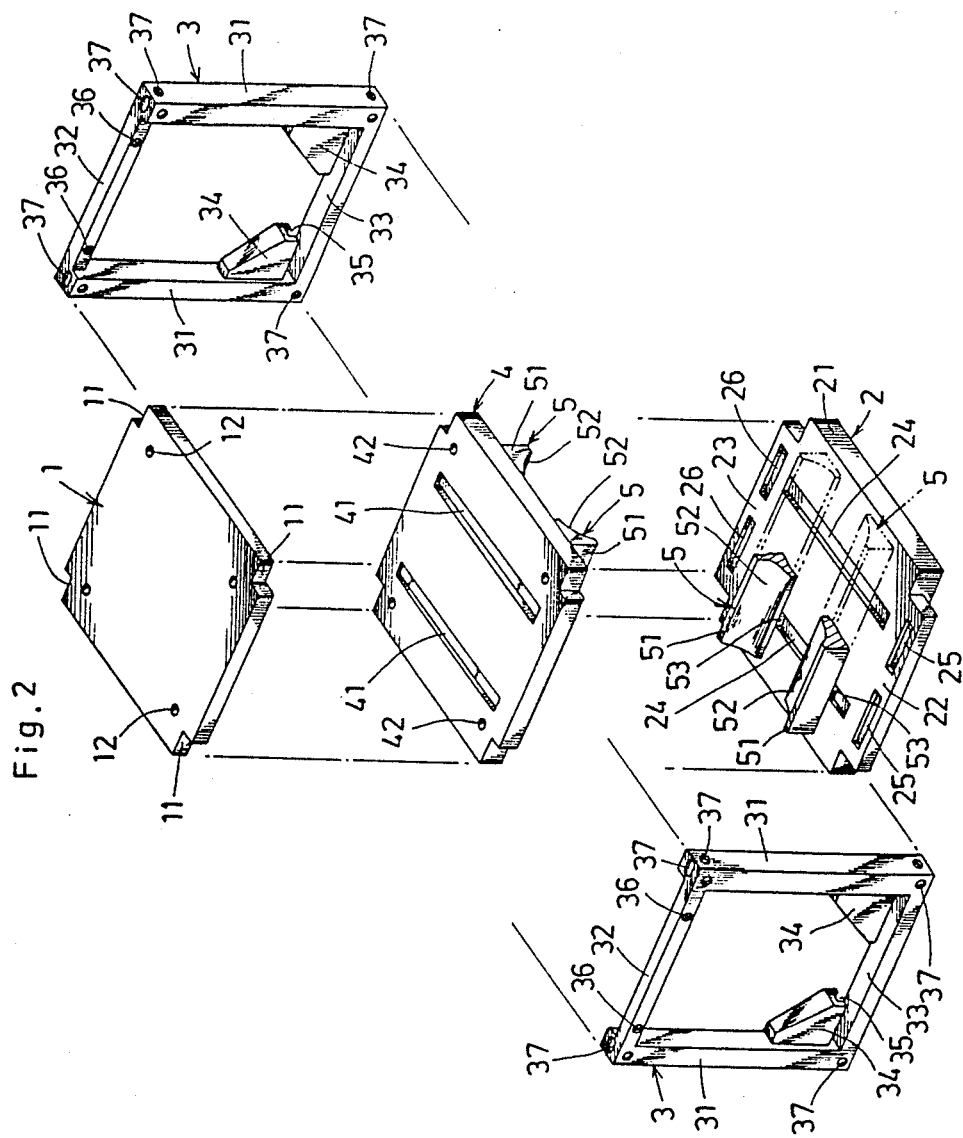
FIG. 2 is the exploded perspective view of the roll cargo transporting container shown in FIG. 1.

Referring now to FIGS. 2 and 3, a preferred embodiment of the roll cargo transporting container related to the invention is described below.

The bottom frame member 2 is provided with narrow-width projections 22 and 23 on the lateral surfaces of square board 21 having the predetermined thickness. A pair of guide grooves 24 are provided in the position close to the center of square board 21. Bracket member 5 is provided in order that it can slidably be engaged with guide groove 24. In addition, each pair of wedge-engaging grooves 25 and 26 are provided at specific positions on the upper surfaces of projections 22 and 23.

The top frame member 1 has flat shape identical to that of the bottom frame member 2. The top frame member 1 is provided with four cutout positions 11 engaging with each piece of the main pillar frame members 3 engaging with four corners. In addition, the top frame member 1 is provided with toggle-thrusting portions (not shown) at specific positions of these cutout portions 11 for connection with respective main pillar frame members 3. The top frame member 1 is also provided with engaging hole 12 at a specific position for allowing insertion of the projection of flange member 5' which is described later on.

The main pillar frame member 3 is of hollow and square configuration, which is provided with a pair of vertical pillar members 31 and the upper and lower frames 32 and 33 which connect both edges of vertical pillar member 31. Of these, only the upper frame 32 has narrow width. Inwardly projecting trapezoidal members 34 are installed to specific positions at the lower portion of the opposite vertical pillar members 31. Wedge-engaging groove 35 is provided at the bottom portion of the inwardly-projecting trapezoidal member 34. The reference numeral 36 represents toggle-insertion hole and 37 fixing hole having such a shape identical to that is formed in the corner metal fittings of any conventional ISO standard container. Distance between the lower frame 33 and the bottom surface of the inwardly-projecting trapezoidal member 34 is slightly wider than the thickness of projections 22 and 23.

A pair of guide grooves 41 are provided at specific positions of flat board (having flat shape identical to that of the top frame member 1) of the sliding frame member 4 being opposite from guide grooves 24, and in addition four engaging holes 42 are provided against engaging holes 12.

Bracket members 5 are provided with projections 53 which slidably engage with guide grooves 24 and 41 below lengthy rigid bodies 51 having arc-shaped surface (52) being engaged with external circumferential surface of roll cargo 7. Cargo operator can selectively mount lengthy rigid bodies 51 by choosing the one having a single arc-shaped surface 52 or the one having two arc-shaped surfaces 52. Bracket member 5' has the constitution almost identical to that of bracket member 5. Bracket member 5' has a pair of projections (not shown) engaging with holes 12 and 42 in place of projection 53 mentioned above. These are the only difference between bracket members 5 and 5'.

To assemble the roll cargo transporting container featuring the constitution mentioned above, container operator first inserts projections 22 and 23 between the lower frame 33 of the main pillar frame member 3 and the inwardly projecting trapezoidal member 34 for securing the bottom frame member 2. Next, operator inserts wedges 6 between projections 22 and 23 and the inwardly projecting trapezoidal member 34 so that wedge-engaging grooves 25, 26, and 35 can respectively be engaged with wedges 6. As a result, the bottom frame member 2 and a pair of main pillar frame members 3 can integrally be combined with each other. Operator then engages a pair of bracket members 5 with guide grooves 24 of the bottom frame member 2, and then he can properly set positions of these bracket members 5 in accordance with external diameter of roll cargo 7 to be stored in the container.

Consequently, operator can load roll cargo 7 on the bottom frame member 2 in process of packaging operation at the production line of manufacturing factory by allowing roll cargo 7 to be supported by arc-shaped surfaces 52 of the pair of bracket members 5. Next, operator lowers the position of sliding frame member 4 whose four corners remain being engaged with the main pillar frame member 3. This allows flange member 5 below sliding frame member 4 to be engaged with the upper surface of roll cargo 7 before surrounding the roll cargo with four arc-shaped surfaces 52. Operator then positions the top frame member 1 at the top of the main pillar frame member 3, and then, he thrusts toggles (not shown) into the top frame member 1 through toggle-inserting holes 36. This integrally combines the top frame member 1 with the main pillar frame members 3 and prevents the sliding frame member 4 from being disengaged. Refer now to FIG. 4-A. Operator can store roll cargo 7 having the largest diameter while sliding frame member 4 remains in contact with the top frame member 1. Conversely, operator can also store roll cargo 7 having relatively narrow diameter while the sliding frame member 4 is apart from the top frame member 1. If the condition shown in FIG. 4-B were present, it is desirable that sliding frame member 4 be prevented from freely sliding itself by inserting spacer (not shown) between sliding frame member 4 and the top frame member 1. While the condition shown in FIG. 4-B is present, lateral surface of roll cargo is surrounded by arc-shaped surfaces 52 of flange member 5 at four positions so that roll cargo can immovably be fixed in position. Consequently, the container embodied by the invention safely transports roll cargo without causing even the slightest deformation and/or damage to occur during sea or overland transportation.

After completing sea or overland transportation of roll cargo stored in the container related to the invention, operator first draws out wedges 6 and toggles, and then he disengages the top frame member 1, bottom frame member 2, main pillar frame members 3, and the sliding frame member 4, from each other. Finally, each unit of container embodied by the invention is disassembled into a compact unit before eventually being transported to a certain destination. For example, if the length of the roll cargo transporting container related to the invention is one third the total length (20 ft for example) of any conventional ISO standard container, then, three units of the disassembled containers embodied by the invention can be stored in each ISO standard container, and likewise, six units of the disassembled container embodied by the invention can be stored in a 40 ft-long conventional ISO container.

If roll cargo 7 had significantly narrow diameter, operator mounts two pieces of bracket members 5 each having an arc-shaped surface 52 and another bracket member 5 having two arc-shaped surfaces 52 to the bottom frame member 2 by engaging them with guide grooves 24, and then, operator mounts two pieces of roll cargo 7 in order that these can be supported by arc-shaped surfaces 52 facing each other. Operator then lowers the position of sliding frame member 4 engaged with bracket member 5' on the bottom surface by allowing bracket member 5' to face bracket 5 having an arc-shaped surface 52, and then, operator sandwiches two pieces of roll cargo 7 between these brackets.

Next, as was done for the bottom frame member 2, operator then mounts three pieces of bracket members 5 onto upper surface of sliding frame member 4. Operator then mounts two pieces of roll cargo 7 onto bracket members 5, and then, he sets the top frame member 1 between main pillar frame members 3 while the top frame member 1 is engaged with two pieces of bracket members 5' on the bottom surface. Operator then thrusts toggles to allow additional two pieces of roll cargo 7 to firmly be sandwiched in position.

By implementing those sequential processes mentioned above, as shown in FIG. 4-C, the container related to the invention can securely store four pieces of roll cargo 7 without causing them to come into contact with each other and move out of the fixed position. The container related to the invention stably holds roll cargo 7 in the predetermined position even when being subjected to external force generated by rolling and pitching of the freight vessel or by startup and stop of the movement of trucks on the way of transportation, thus securely preventing roll cargo from incurring unexpected deformation and/or damage.

Figure 5:
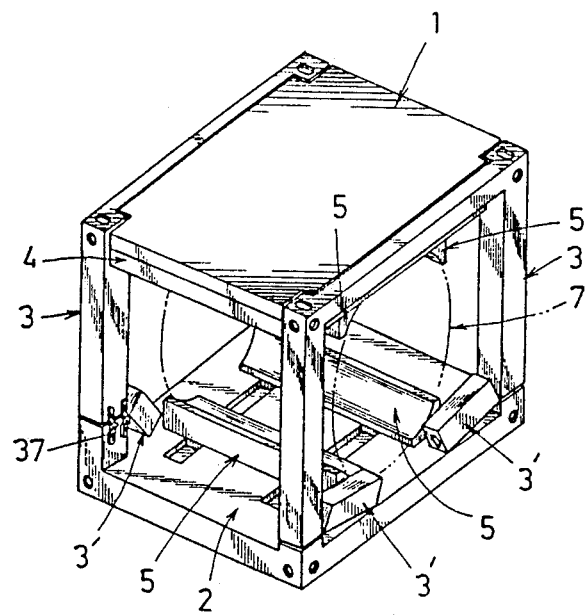
FIG. 5 is the perspective view of another preferred embodiment of the roll cargo transporting container related to the invention.
Figure 6:
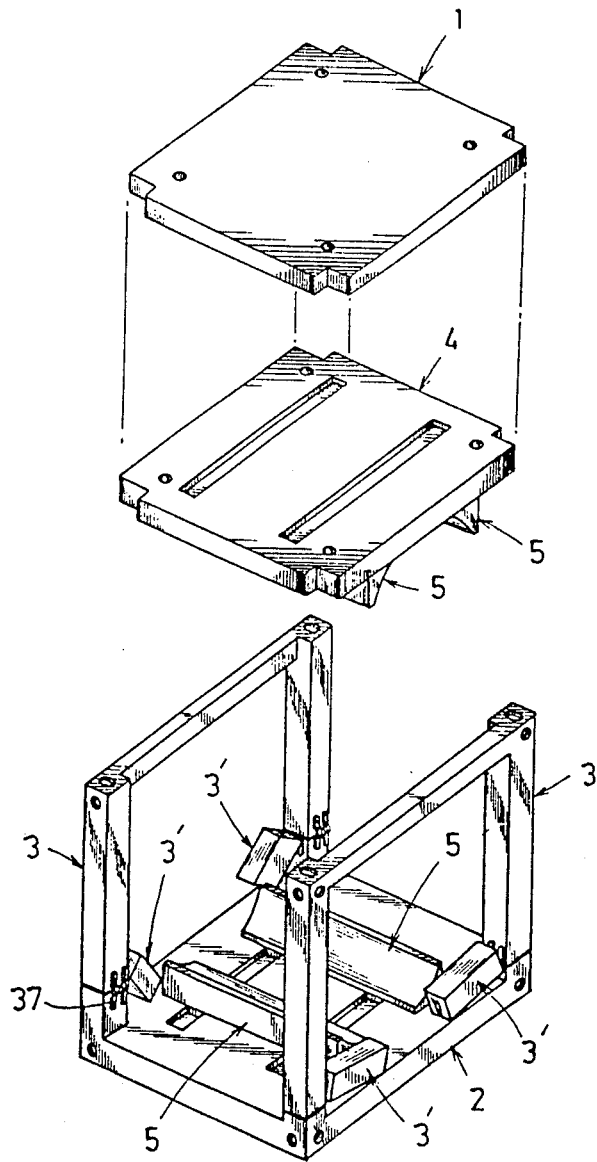
FIG. 6 is the exploded perspective view of the container shown in FIG. 5.
Figure 7:
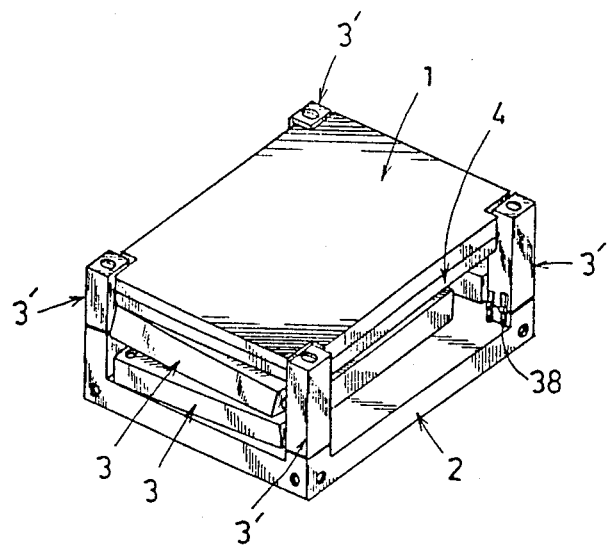
FIG. 7 is the perspective view of the folded constituents of the container related to the invention.

FIGS. 5 and 6 respectively show another preferred embodiment of the container related to the invention. Differences from those preferred embodiments cited above are described below.

Using hinge member 37, the main pillar frame members 3 are erected in the manner they can fall flat on the bottom frame member 2 as required. Auxiliary pillar members 3' replacing the main pillar frame members 3 are installed via hinge members 38 for erection. More particularly, one of the main pillar frame members 3 is set to a specific height position flush with the upper surface of the bottom frame member 2 so that it can fall flat as required. Auxiliary pillar member 3' in conjunction with the former main pillar frame member 3 is set to a specific position higher than the other auxiliary pillar member 3' in conjunction with the latter main pillar frame member 3.

Accordingly, like the above preferred embodiment, the container related to this preferred embodiment stably holds roll cargo 7 in position by falling down auxiliary pillar member 3' using hinge member 38 followed by erection of the main pillar frame member 3 by means of hinge member 37. No special member is provided for holding the erected main pillar frame member 3, however, since the presence of the sliding frame member 4 prevents hinge member 37 from moving itself in the folding direction, assembled condition of the container is securely maintained.

When the container related to this preferred embodiment is free from transportation of roll cargo 7, operator first falls down the main pillar frame member 3 set to a specific height position flush with the upper surface of the bottom frame member 2, and then, he falls down the other main pillar frame member 3. This allows the operator to stack up both of the flatly-laid main pillar frame members 3 for storage on the upper surface of the bottom frame member 2. Next, operator erects auxiliary pillar members 3' in place of those main pillar frame members 3, and then, operator can lower the total height of the container by allowing corners of sliding frame member 4 and the top frame member 1 to remain in the engagement with respective auxiliary pillar members 3'. Although no special member is provided for holding the erected auxiliary pillar members 3', since the top frame member 1 and sliding frame member 4 jointly prevent hinge member 38 from moving itself in the folding direction, folding condition of the container can securely be maintained.

When either the main pillar frame member 3 or the auxiliary pillar member 3' is erected, it is desirable that fixing members like bolts or locking members (not shown) capable of rotating and moving forward and backward against the bottom frame member 2 be used for integrally connecting either the main pillar frame member 3 or the auxiliary pillar member 3' to the bottom frame member 2 in order that the integrated container body can sufficiently be durable to unexpected load generated by external force on the way of transportation.

Figure 8:
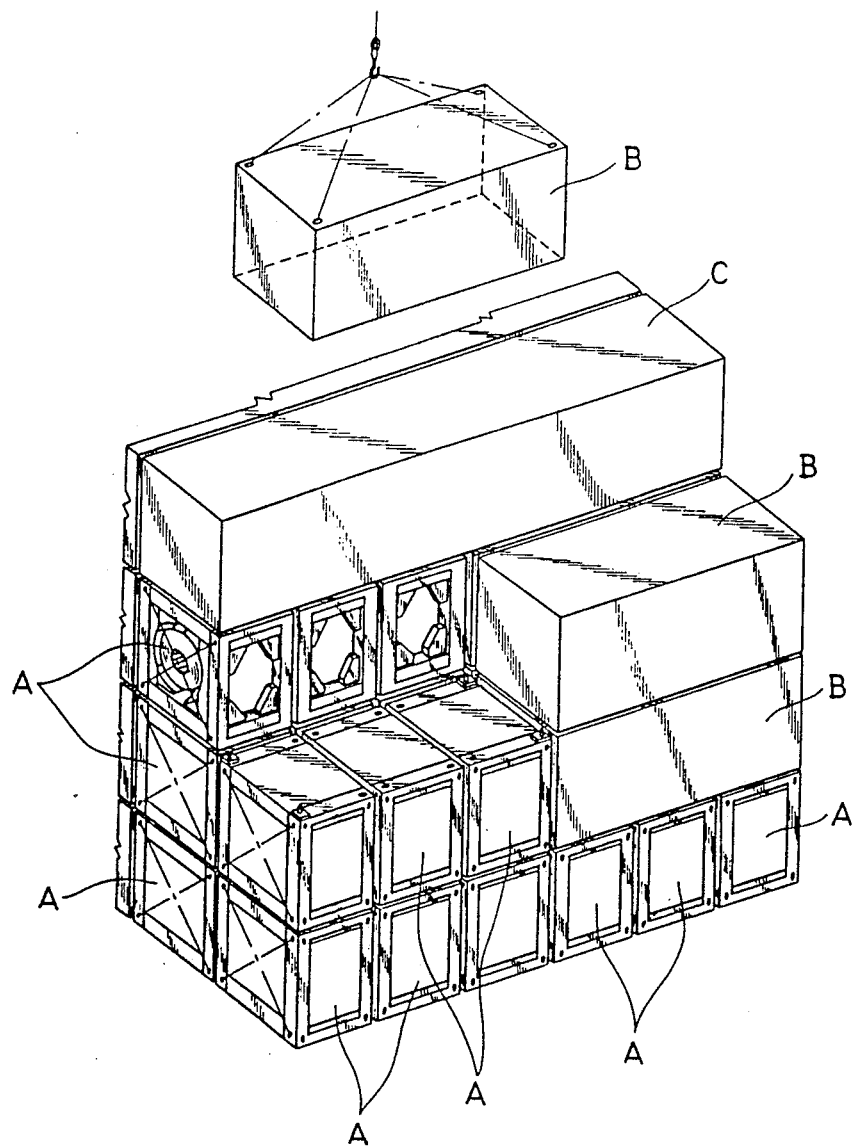
FIGS. 8 and 9 are respectively the perspective views representing the state in which the containers related to the invention are jointly stacked together with ISO standard containers.
Figure 9:
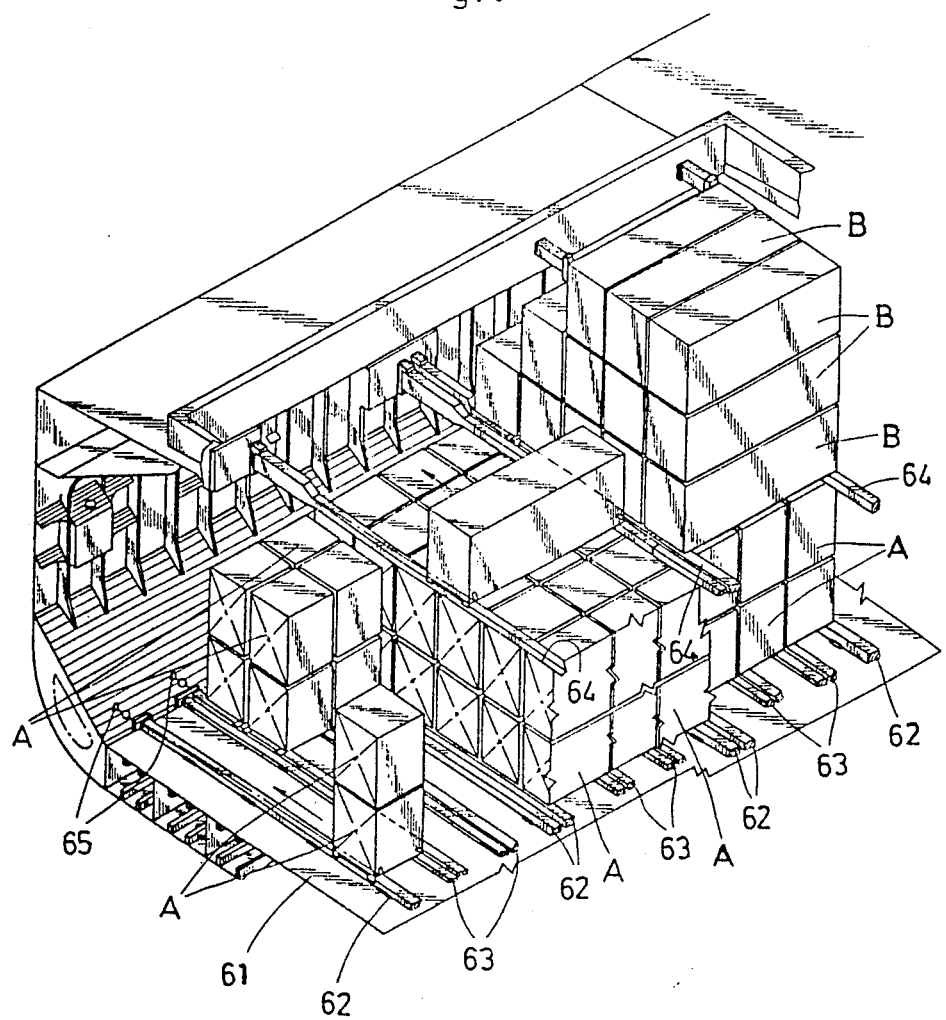

If the length of the roll cargo transporting container embodied by the invention were one third the total length (20 ft) of any conventional ISO standard container, as shown in FIG. 8, cargo operator can store a plurality of 20 ft-containers B or 40 ft-containers C of ISO standard on the double-bottom deck of the hold of a full-container freight vessel above the roll cargo transporting containers A stored by an array on the bottom by removably installing container-fixing sockets (not shown) in the interim space reserved for storing 20 ft and/or 40 ft ISO standard containers. In this case, the freight vessel can store three units of the roll cargo transporting container A in the space capable of storing a 20 ft ISO container B, or the freight vessel can store six units of the roll cargo transporting container A in the space capable of storing a 40 ft ISO container C. Like the full-container freight vessel, any conventional freight vessel equipped with loaded-container retentive mechanism can jointly load the roll cargo transporting containers related to the invention together with conventional ISO standard containers. Conversely, as shown in FIG. 9, any conventional freight vessel without loaded-container retentive facilities can also execute slide-loading of roll cargo transporting containers related to the invention by employing cranes and forklifts in the longitudinal or latutudinal direction inside of the hold by stacking up containers in double layers and also the following storage operation by installing sliding beams 62 and 63 onto the double-bottom deck 61 inside of the hold. Note that the sliding beam 62 is used for handling conventional ISO standard containers, whereas sliding beam 63 is used for handling roll cargo transporting containers. Cargo operator can also load ISO standard containers on the upper layer as required. Stacking beam 64 shown in FIG. 9 prevents weight of containers on the upper layer from adversely affecting those containers in the lower layers and also prevents stacked containers from collapsing themselves and incurring damage from rolling and pitching of the freight vessel on the way of sea transportation. Sliding wire 65 transmits transferring force to containers which are supported by sliding beams. Those sliding beams and stacking beams cited above are well known, which are respectively cited in the Japanese Patent Nos. 1,560,716, 1,486,340, and 1,560,716.

When transporting roll cargo containers related to the invention overland, cargo operator can jointly stack them together with conventional ISO standard containers by removably installing positioning members inside of the existing container-fixing space of a freight car or a truck. In particular, when transporting these by means of a trailer or a truck, cargo operator can easily execute binding operation merely by binding roll cargo transporting containers related to the invention.

Figure 10:
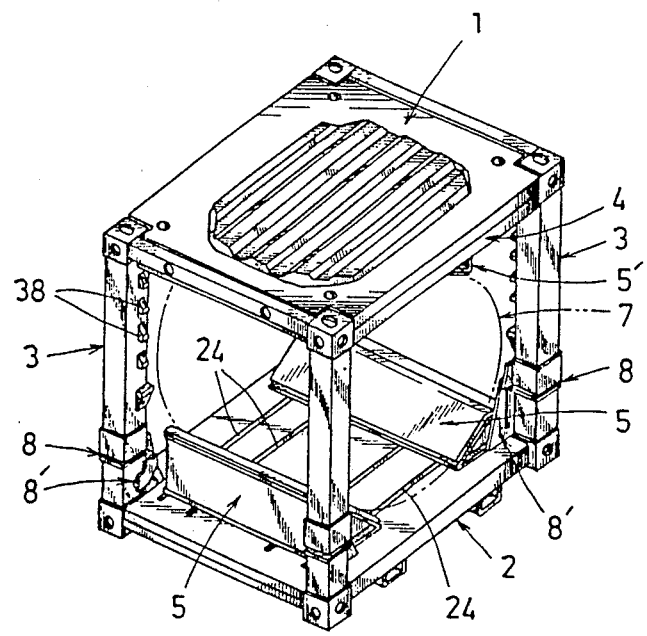
FIG. 10 is the perspective view of a still further preferred embodiment of the roll cargo transporting container related to the invention.
Figure 11:
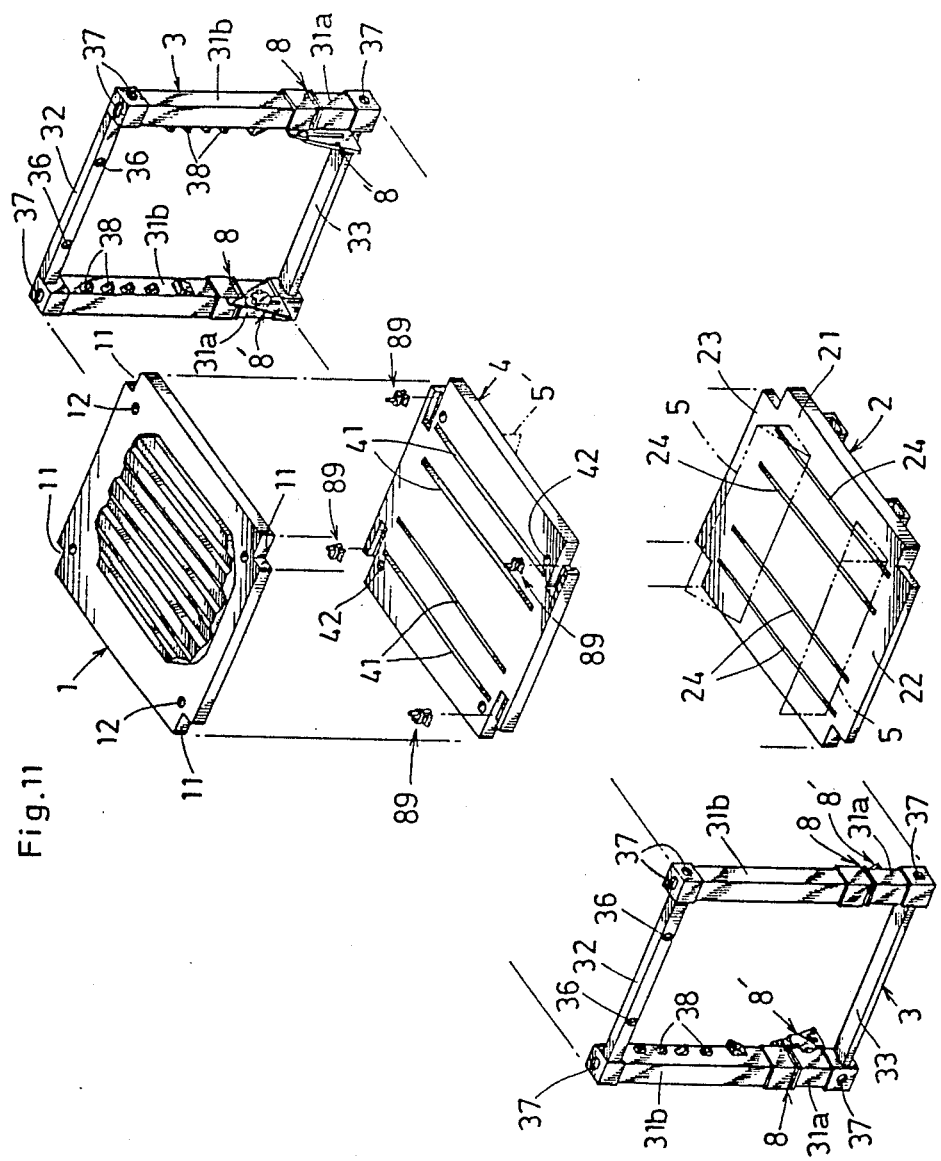
FIG. 11 is the exploded perspective view of the container shown in FIG. 10.

FIG. 10 is the perspective view of another preferred embodiment of the roll cargo transporting container related to the invention. FIG. 11 is the exploded perspective view of the container shown in FIG. 10. Only the constituents of the top frame member 1, bottom frame member 2, main pillar frame member 3, sliding frame member 4, and bracket members 5 and 5' make differences from those of the preferred embodiment shown in FIG. 1.

The top frame member 1 is composed of the center-open frame member and corrugated member mounted onto the center, thus achieving light-weight construction and retention of sufficient strength as well. Provision of four guide grooves 24 and deletion of wedge-engaging grooves 25 and 26 make differences from the constitution of the bottom frame member 2 shown in FIG. 1.

The main pillar frame member 3 shown in FIG. 10 differs from the one shown in FIG. 1 in the following points. Vertical pillar member is split into two parts, i.e., provision of base pillar member 31a which is set to the low position and vertical pillar member 31b which is set to the upper position; provision of connection member 8 for integrally erecting vertical pillar member 31b on base pillar member 31a; provision of lay-down guide mechanism 8' which facilitates inclining of vertical pillar member 31b towards base pillar member 31a; and provision of projection 38 which can be thrusted into the specific position of the upper half of vertical pillar member 31b.

Figure 12:
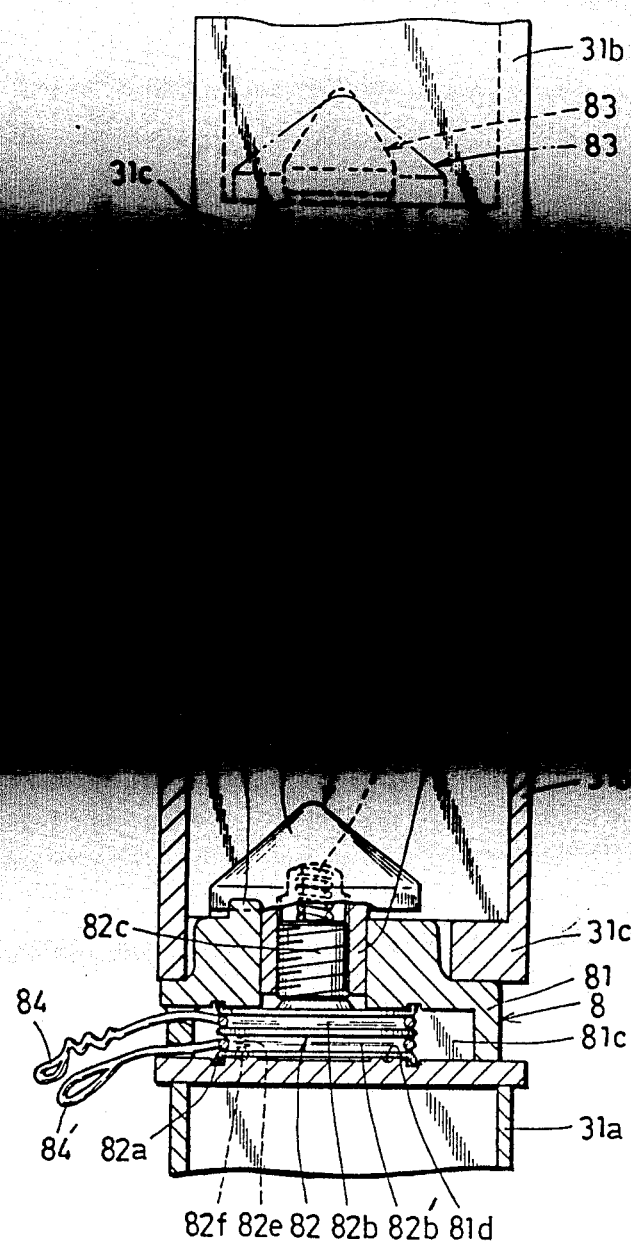
FIG. 12 is the lateral view of essential constituents of connection members related to the invention.
Figure 17:
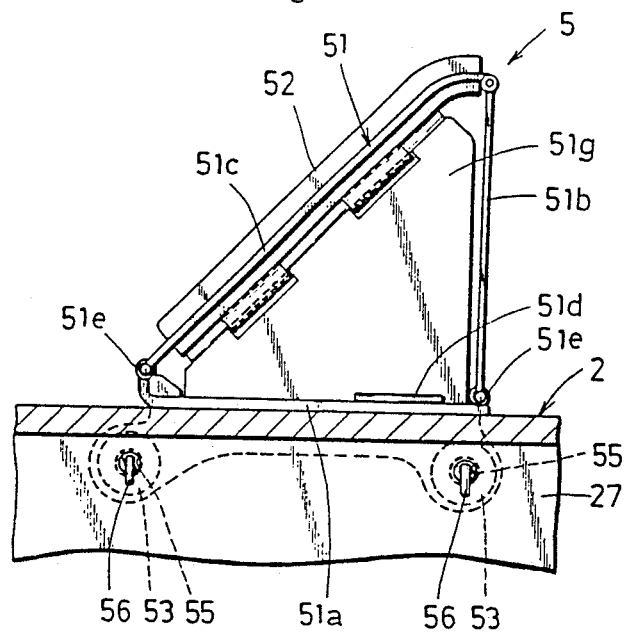
FIG. 17 is the lateral view of bracket member.
Figure 18:
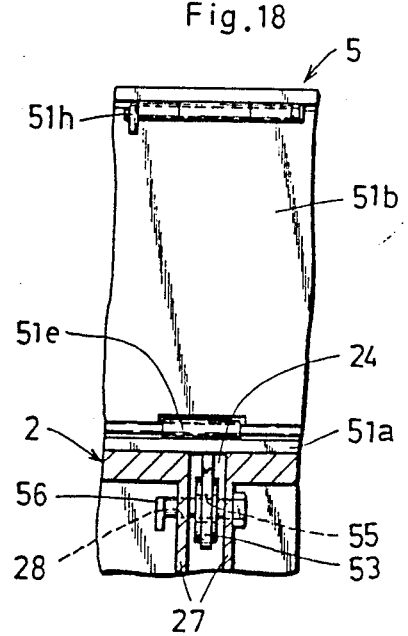
FIG. 18 is the rear view of bracket member.
Figure 19:
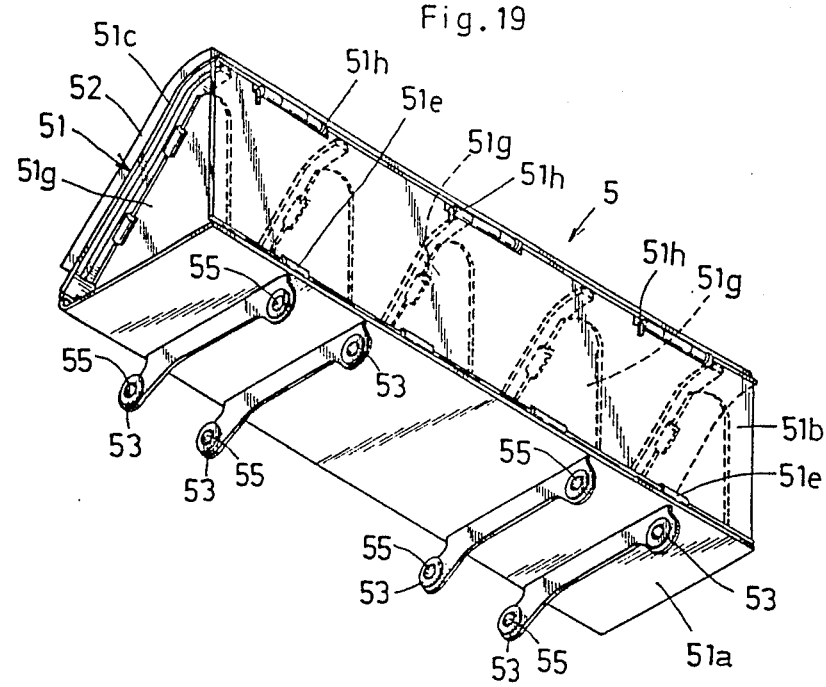
FIG. 19 is the perspective view of the bottom surface of bracket member.

As shown in FIGS. 12 through 14, connection member 8 is composed of the following; casing 81, rotary member 82 which is rotatably stored in casing 81, locking member 83 which rotates itself following the rotation of rotary member 82 or enters into or goes out of rotary member 82, and driving wires 84 and 84' which rotate rotary member 82.

Rotary member 82 is composed of disc 82a having grooves 82b and 82b' for winding wires 84 and 84' onto circumferential surface of disc 82a, and screw shaft 82c which projects itself from the center of disc 82c. A hole (not shown) formed in the bottom surface and at a position close to circumferential edge of disc 82a stores click-stop ball 82f which is constantly energized in the upward direction by spring 82e.

Position of rotary member 82 is correctly controlled by allowing the click-stop ball 82f to be engaged with concave 81d formed at a specific position of space 81c of the casing 81. Wires 84 and 84' are wound to rotate rotary member 82 in the direction opposite from each other.

Locking member 83 is composed of the following; screw cylinder 83a spirally matching screw shaft 82c, engaging 83b engaging with corner metal fitting 31c of vertical pillar member 31b (this corner metal fitting is compatible with ISO standard), and spring 83c stored in screw cylinder 83a in the compressed condition. Engaging member 83b is provided with rectangular (extending in one direction) and flat configuration, while the upper surface having isosceles triangular shape projects itself upward. Range of the rotation of locking member 83 is controlled by causing engaging projection 83f outside of the casing 81 to be engaged with engaging member 83b.

Locking member 83 is rotated by spring 83c in a specific range (about a maximum of 90°) ruled by engaging projection 83f in the follow-up movement against the rotation of rotary member 82. Locking member 83 moves forward and backward in accordance with relative rotation of screw shaft 82c and screw cylinder 83a. Concretely, when the rotary member 82 rotates in one direction while engaging member 83b remains engaged with projection 83f, locking member 83 is moved in the direction close to casing 81 resisting force energized by spring 83c. When the locking member 83 rotates in the inverse direction, force energized by spring 83c moves the locking member 83 in the direction apart from casing 81. Consequently, range of the rotation of engaging member 83b is restricted by projection 83f, thus allowing cargo operator to easily connect and disconnect engaging member 83b to and from the cover metal fitting 31c.

As shown in FIG. 15-A, the lay-down guide mechanism 8' is composed of the following; guide member 85 which is integrally set to the inner side of base pillar member 31a, flange member 86 integrally set to the bottom of vertical pillar member 31b, auxiliary guide member 87 which is set to the upper edge of guide member 85 so that it can horizontally rotate itself, and shaft 88 which projects itself from a specific position below the flange member 86.

Shaft 88 is engaged with guide groove 85a of guide member 85 so that it can perform sliding operation. When shaft 88 moves itself to the uppermost position along guide groove 85a, auxiliary guide member 87 is moved to the position of guide member 85. This allows shaft 88 to be held by arc-shaped concave 87a of the auxiliary guide 87 so that shaft can be held in the condition without making downward movement.

Consequently, when the base pillar member 31a is disengaged from the vertical pillar member 31b by removing connection member 8, the vertical pillar member 31b inclines and falls flat pivoting shaft 88. As shown in FIG. 15-B, when rotating auxiliary guide member 87 by slightly raising shaft 88 while laying the vertical pillar member 31b flat, shaft 88 descends itself by effect of own weight so that the vertical frame member 31b can flatly be laid on the bottom frame member 2. Operator can erect vertical pillar member 31b by reversing those processes mentioned above.

Sliding frame member 4 used for this preferred embodiment is provided with four guide grooves 41 and engaging mechanism 89 which prevents sliding frame member 4 from moving upward, thus making difference from that is used for the preferred embodiment shown in FIG. 1.

FIG. 16 is the exploded perspective view of the engaging mechanism 89 mounted on sliding frame member 4 for preventing it from moving upward. Engaging mechanism 89 is composed of engaging member 89b which is spirally engaged with rotatable screw shaft 89a and slidably controlled, and rotation supporting base 89d which supports screw shaft 89a so that it can incline and fall flat itself as required.

Engaging member 89b is made of flat plate having a specific shape, whose tip end has nail portion 89c which vertically extends upward. Projection 38 formed at a specific position of vertical pillar member 31b has concave 38f storing nail portion 89c at a specific position of the bottom surface.

Consequently, cargo operator can set position for allowing upward movement of sliding frame member 4 by causing engaging member 89b to ascend itself by rotating screw shaft 89a for allowing insertion of engaging member 89b into concave 38f of projection 38 set to the vertical pillar member 31b. As a result, roll cargo 7 can securely be held between sliding frame member 4 and flange member 5 by first lowering position of sliding frame member 4 to a level flush with the upper surface of roll cargo 7 and then turning screw shaft 89a. This securely prevents sliding frame member 4 from rising by applying projection 38 and engaging member 89b so that roll cargo 7 can be held in the initially wound condition.

Foldable constitution makes difference between bracket members 5 and 5'.

Bracket member 5 is composed of a plurality of pairs of projections 53 slidably engaged with guide grooves 24 and 41, which is installed to a specific position below lengthy rigid body 51 having inclined surface 52 engaged with external surface of roll cargo 7. Cargo operator can selectively mount bracket member 5 having an inclined surface or two inclined surfaces as required.

Referring now to FIGS. 17 through 20, detailed description is given below. The lengthy rigid body 51 is composed of bottom plate 51a having projection 53 at a specific position of bottom surface, vertical plate 51b which is rotatably connected to a side of bottom plate 51a, and inclined plate 51c which is rotatably connected to a side opposite from the side of bottom plate 51a just mentioned.

Bottom plate 51a has projections 53 at specific positions of bottom surface, where projections 53 extend themselves in the opposite direction in correspondence with guide grooves 24. Aperture 55 penetrating wedge 56 is provided at the tip portion of two pairs of projections on both ends of the bottom plate 51a.

Vertical plate 51b and inclined plate 51c are rotatably connected to each other by means of hinge members 51e set to both sides of the bottom plate 51a.

The projection 53 has aperture 55 at the position opposite from the positioning hole 28 formed at the predetermined positions of two pairs of flanges 27 set in parallel with guide groove 24. The projection 53 can be secured to the bottom frame member 2 by penetrating wedge 56 through positioning hole 28 and aperture 55. Bone-frame plate 51g is installed to the predetermined position of the lateral surface of vertical plate 51b being opposite from the inclined plate 51c so that the bone-frame plate 51g can rotate itself in the horizontal direction. The bottom end of bone-frame plate 51g remains in contact with bottom plate 51a. The top end of bone-frame plate 51g remains in contact with inclined plate 51c. Stopper 51d prevents bone-frame plate 51g from rotating itself.

After completing assembly, the upper surface of the inclined plate 51c is coated with rubber.

Rivet 51h is removably installed to the position at which the vertical plate 51h is in contact with the inclined plate 51c.

Figure 20:
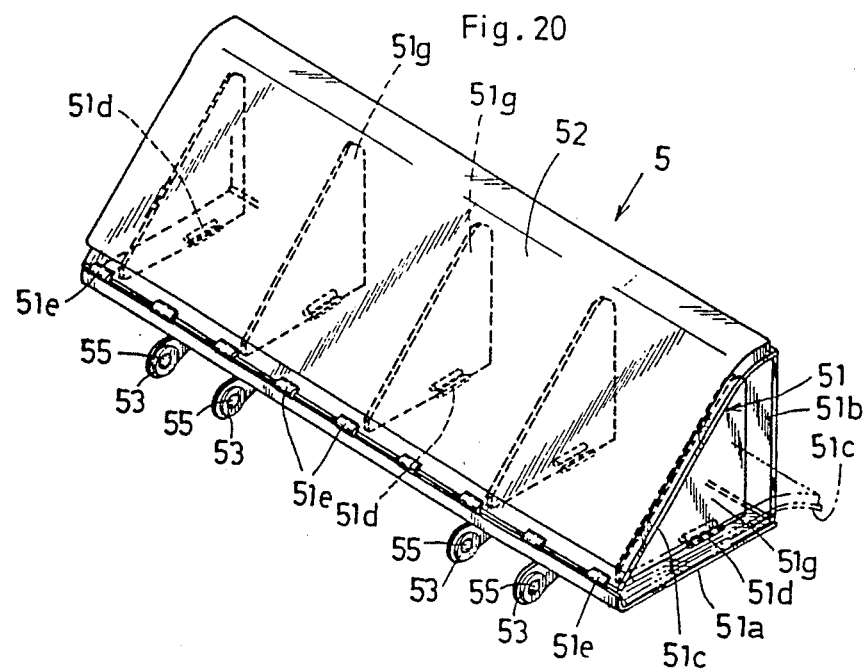
FIG. 20 is the perspective view of bracket member.

Consequently, after completing assembly, lengthy rid body 51 having right-angled triangular shape is generated. Operator can sequentially fold the bone-frame plate 51g after removing rivet 51h, vertical plate 51b, and the inclined plate 51c so that the entire unit can be folded into a flate-plate structure as shown in FIG. 20 by means of two-dot chained line.

The above description has referred to bracket member 5 having a single inclined surface 52. Bracket member 5 having two inclined surfaces 52 can be made by rotatably installing the inclined plate 51c in place of vertical plate 51b. Constitution of other portions may be identical to that of the single inclined surface bracket member. In addition, as shown in FIG. 22, even when using such a bracket member 5 without having vertical plate 51b, if stopper 51d could securely prevent the rotation of the bone-frame plate 51g, bracket member 5 can securely support roll cargo 7. Note that bracket member 5' has the constitution almost identical to that of bracket member 5 except for the provision of projections (not shown) engaging with holes 12 and 42 instead of projection 53.

Consequently, when employing this preferred embodiment, like the one shown in FIG. 1, the roll cargo transporting container related to the invention stably stores roll cargo having a wide variety of dimensions. In particular, this preferred embodiment allows engaging mechanism 89 to securely prevent sliding frame member 4 from moving upward, thus significantly promoting stability in holding roll cargo in position.

Figure 23:
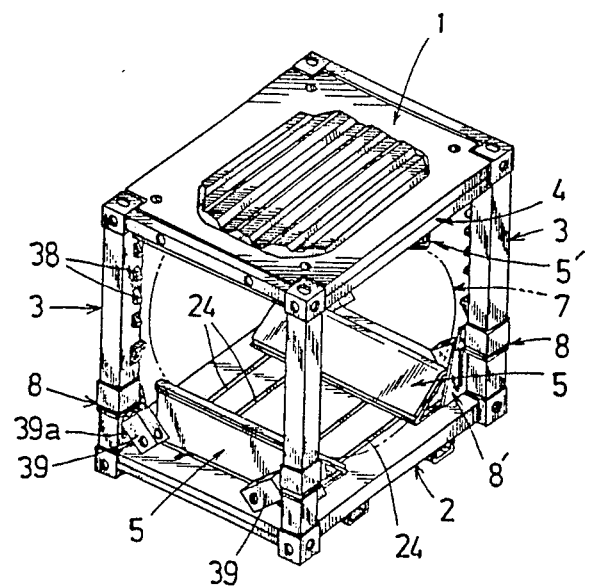
FIG. 23 is the perspective view of a still further preferred embodiment of the roll cargo transporting container related to the invention.
Figure 24:
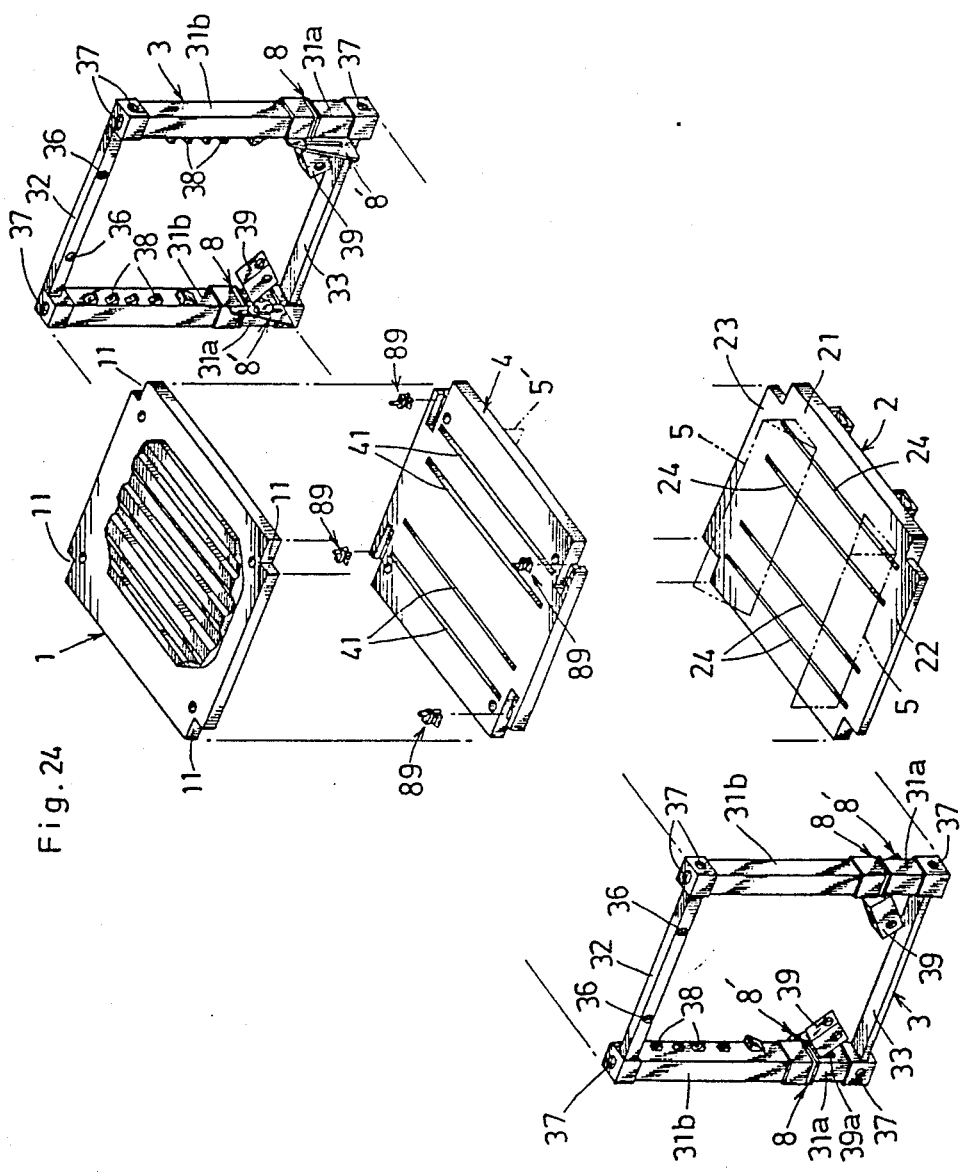
FIG. 24 is the exploded perspective view of the roll cargo transporting container shown in FIG. 23.

FIGS. 23 and 24 respectively present a still further preferred embodiment of the roll cargo transporting container related to the invention. When inclining and falling vertical pillar member 31b flat, auxiliary pillar member 39 is connected to it via hinge member 39a so that hinge member 39 can be erected in place of vertical pillar member 31b.

Figure 25:
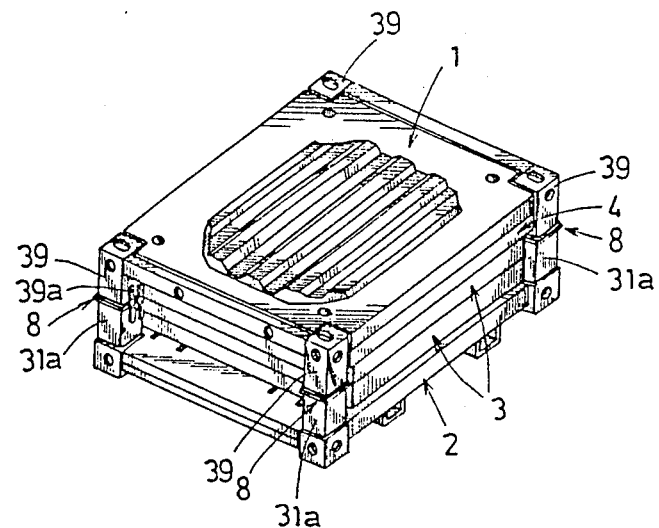
FIG. 25 is the perspective view of the folded container related to the invention.

As a result, after falling vertical pillar member 31b flat, all the constituent members can be folded into a low-height integrated unit (see FIG. 25) by first erecting auxiliary pillar members 39 on the base pillar members 31a and then storing sliding frame member 4 and the top frame member 1 under guidance of auxiliary pillar members 39.

Figure 26:
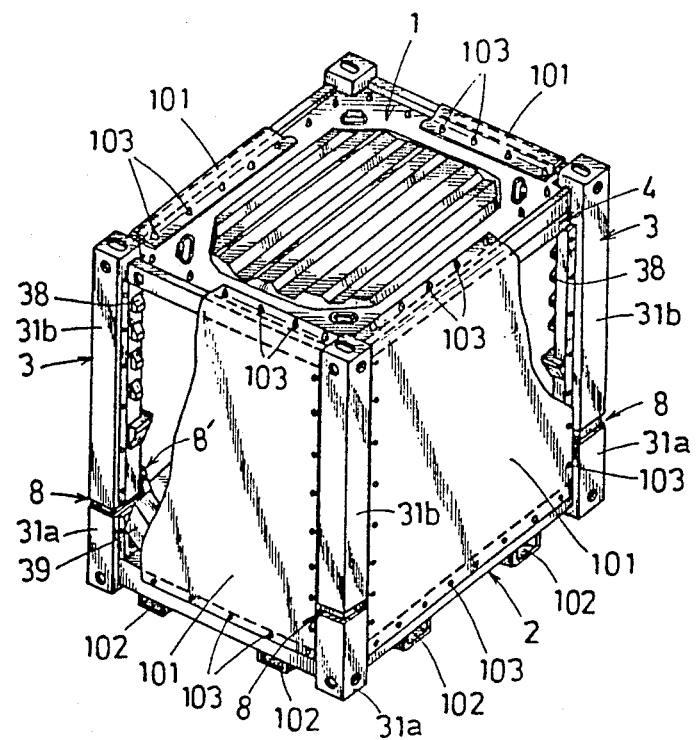
FIG. 26 is the partially exploded perspective view of a still further preferred embodiment of the roll cargo transporting container related to the invention.

FIG. 26 is the partially exploded perspective view of a still further preferred embodiment of the roll cargo transporting container related to the invention. Base pillar members 31a are integrally connected to the bottom frame member 2. Space between four main pillar frame members 3 is covered with tarpaulin sheets for example. Forked pockets 102 are provided below the bottom surface of the bottom frame member 2 in the direction crossing each other at right angle. These make up differences from the above-cited preferred embodiments.

More particularly, covers 101 are provided with a specific dimension enough to cover space formed by the edges of the top frame member 1, bottom frame member 2, and the main pillar frame member 3. Edges of cover 101 are secured with U-shaped bolts 103 which allow insertion of nuts 104 into both ends.

Figure 27:
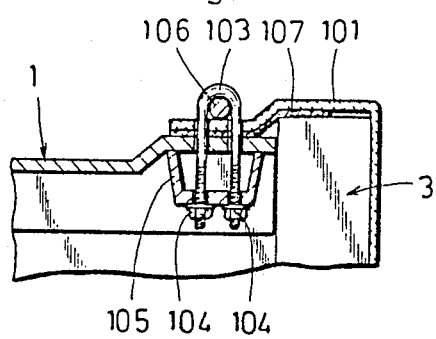
FIG. 27 is the vertical sectional view representing the position at which external cover is fixed.

FIG. 27 is the vertical sectional view representing the condition in which cover 101 is secured to the top frame member 1 with U-shaped bolts 103. Apertures are provided at specific positions of the top frame member 1 for allowing insertion of U-shaped bolts 103. Plate 105 is installed to a specific position below the bottom surface of the top frame member 1 for ruling the positions of nuts 104. Metal fittings (not shown) are provided at specific positions of the edges of cover 101 for allowing insertion of U-shaped bolts 103. In addition, the bottom plate 51a is also provided with wire 106 which penetrates space formed by U-shaped bolts 103 and cover 101, while the bottom plate 51a is also provided with water-proof member 107 at a position close to the U-shaped-bolt-secured position. Cover-fixing member is installed to a specific position of the bottom frame member 2 so that it can be prevented from overlapping another cover-fixing member installed to the vertical pillar member 31b while this member 31b still remains folded.

As a result, when employing this preferred embodiment, the roll cargo transporting container securely protects roll cargo from adversely being affected by wind and rain and also from incurring sweat damage, thus allowing all of roll cargo to be safely transported to destinations without degrading original quality at all. In addition, the roll cargo transporting container related to the invention allows operators to easily stack up containers during outdoor operations at the origin of shipment and also at the destination as well.

It should be understood that the scope of the roll cargo transporting container related to the invention is by no means confined to those preferred embodiments cited above, but the invention also offers possibility for removably connecting the top frame member 1, bottom frame member 2, and the main pillar frame members 3 to each other by means of bolts, another possibility for removably connecting the bottom frame member 2, sliding frame member 4, and bracket member 41 to each other by means of bolts, and another possibility for integrally combining base pillar member 31a with the bottom frame member 2 for example.

Figure 28:
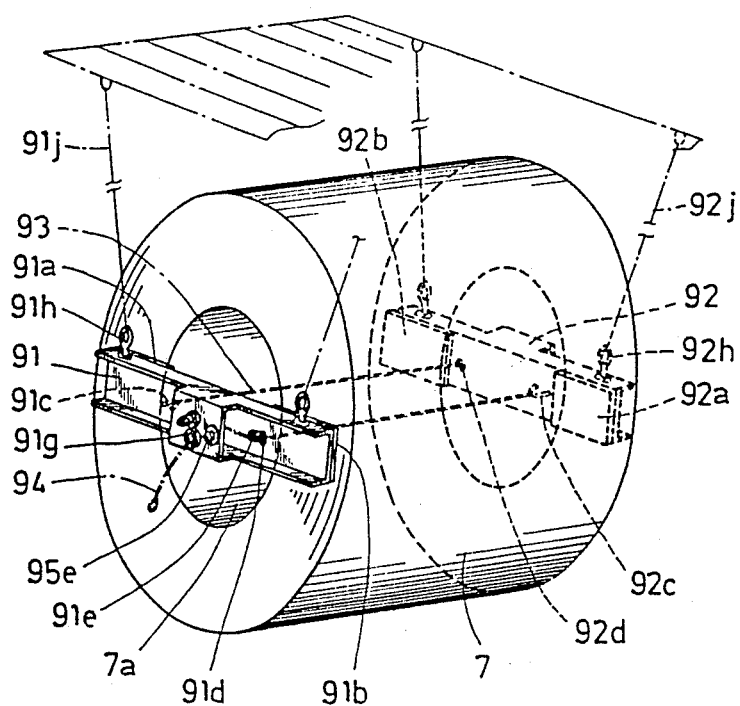
FIG. 28 is the schematic perspective view of a preferred embodiment of the apparatus for preventing roll cargo from incurring divergence of roll core.

FIG. 28 is the schematic perspective view of a preferred embodiment of the apparatus for preventing roll cargo from incurring divergence of the core of roll during transportation. FIG. 29 is the lateral view sectioned in the center. The apparatus has a pair of lengthy rigid bodies 91 and 92 and also a pair of leading chains. More particularly, lengthy rigid body 91 is substantially the grooved body composed of lengthy and flat plate having both lengthy sides being folded in right angle. The lengthy rigid body 91 has a flat plate member connecting the center portion of the grooved body in the longitudinal direction. Except for the center portion, rubber mat layers 91a and 91b are bonded to the surface of lengthy rigid body 91 coming into contact with roll cargo. Eye ring 91c is set to a specific position close to rubber mat layer 91 for connecting an end of leading chain 93. Through-hole 91d is formed at a specific position close to the other rubber mat layer 91b for allowing penetration of leading chain 94. Chain sieve 91e is set to the center of the lengthy rigid body 91. Cargo-fixing metal fitting 91f is also provided. In addition, chain stopper 91g incorporating clamping mechanism is provided at a position close to the member which draws out leading chain. Eye ring 91h is set to a specific position close to the edge of the upper surface of lengthy rigid body 91.

As shown in FIGS. 30A and B, cargo-fixing metal fitting 91f is integrally provided with groove 95a, cut-out portion 95b allowing leading chain 94 to enter into and go out of groove 95a, stopper 95c freely moving itself in the direction close to groove 95a, and stopper groove 95d which is provided at the tip of the stopper 95c for inhibiting return movement of leading chain 94. In addition, the cargo-fixing metal fitting 91f is also provided with screw 95e which allows the entire unit to move forward and backward while correctly maintaining the position relationship between each constituent mentioned above (see FIG. 28). When leading chain 94 moves in the direction shown by arrow A of FIG. 30-A, stopper 95c freely moves itself (see two-dot chained line of FIG. 30-A) to allow leading chain 94 to smoothly move itself. When leading chain 94 is pulled in the inverse direction, movement of stopper 95c is inhibited (see solid line shown in FIG. 30-A), and as a result, movement of leading chain 94 is inhibited by stopper groove 95d.

Lengthy rigid body 92 has the constitution exactly identical to that of lengthy rigid body 91, and thus, description of which is deleted.

When installing the apparatus in subject to roll cargo 7, first cargo operator inserts leading chains 93 and 94 into center hole 7a of roll cargo 7 in the direction opposite from each other, and then, he inserts the free ends of leading chains 93 and 94 extending from center hole 7a into through-holes 92d and 91d, and finally, he draws out these free ends through chain sieves 92e and 91e fixed metal fittings 92f and 91f, and finally clamp-freed chain stoppers 92g and 91g, respectively.

Direction of inserting leading chains 93 and 94 into fixed metal fittings 92f and 91f is arranged in order that free ends can be set to the movable side.

Lengthy rigid bodies 91 and 92 are drawn in the direction approaching each other by allowing operator to pull leading chains 93 and 94 drawn outside, and as a result, rubber mat layers 91a, 91b, 92a, and 92b, are respectively pressed against both-end surfaces of roll cargo 7. Operator then causes chain stoppers 91g and 92g to generate clamping force to fix leading chains 93 and 94 in the drawn-out condition. Then, operator moves fixed metal fittings 92f and 91f by rotating screw 95e of the fixed metal fittings 92f and 91f (see solid line in FIG. 29) so that the fixed leading chains 93 and 94 can enter into fully tensive condition.

When this condition is present, lengthy rigid bodies 91 and 92 apply pressure to the sandwiched roll cargo 7 from inner circumferential layer covering specific range. Consequently, both the lengthy rigid bodies and roll cargo 7 are integrally unified, while the external surface of the unified body is subjected to retentive force. This in turn prevents inner layers of roll cargo 7 from sequentially projecting themselves in one direction when external force is applied to roll cargo in the axial direction, thus allowing the edge surface of roll cargo 7 to constantly remain in the perfect vertical alignment without collapse. Furthermore, since chains or wire ropes 91j and 92j securely connect intervals between eye rings 91h and 92h and adjacent structures, accidental projection and displacement of the inner layers of roll cargo 7 in one direction can be prevented more securely.

As is clear from the above description, roll cargo 7 is securely sandwiched by lengthy rigid bodies 91 and 92 by insertion of leading chains 93 and 94 through center hole 7a of roll cargo 7, and thus, the above mechanism can easily be applied to roll cargo having narrow center hole 7a.

It should be understood that the constitution of fixed metal fittings 91f and 92f is not confined to the one shown in FIG. 30, but the invention also allows use of another constitution capable of selectively determining tensive and tension-free condition of leading chains 93 and 94 by activating seesaw-like swinging movement or by moving simplified lead-chain guide member forward and backward.

Figure 31:
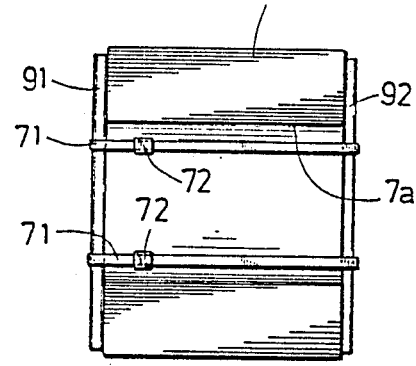
FIG. 31 is the lateral sectional view of another preferred embodiment of the apparatus for preventing roll cargo from incurring divergence of roll core.

FIG. 31 is the lateral sectional view of another preferred embodiment of the apparatus in subject related to the invention. Lengthy tubular rigid bodies 91 and 92 are introduced, whose specific portions close to the center are connected to each other by means of steel belet 71 which is endlessly connected to fixed metal fitting 72. This makes difference from that is shown in FIG. 28.

The apparatus related to this embodiment can easily be applied to any kind of roll cargo 7 having sizable inner diameters. Like the above preferred embodiment, quite satisfactory effect in the prevention of roll cargo from incurring projection and displacement of the inner layers can be achieved by employing simple constitution of the mechanism.

Figure 32:
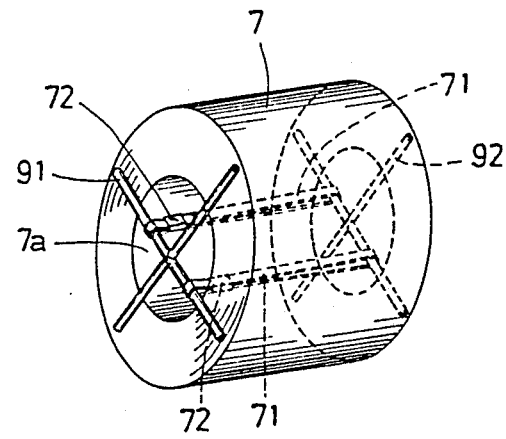
FIGS. 32 and 33 are respectively the schematic perspective views of a still further preferred embodiment of the apparatus for preventing roll cargo from incurring divergence of roll core.

FIG. 32 is the schematic perspective view of a still further preferred embodiment of the apparatus in subject related to the invention. To make difference from those embodiments cited above, crossed constitution of lengthy rigid bodies 91 and 92 is introduced.

When this preferred embodiment is used, crossed constitution of lengthy rigid bodies 91 and 92 provides an increased area available for firmly sandwiching roll cargo 7, thus promoting the effect of pressed sandwiching operation and providing improved effect for securely preventing roll cargo from incurring projection and displacement of the inner layers of roll cargo 7 on the way of sea/overland transportations.

Figure 33:
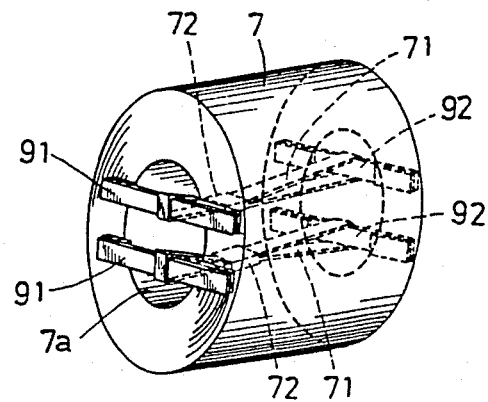

FIG. 33 is the schematic perspective view of a still further preferred embodiment of the apparatus in subject related to the invention. To make the difference from the above preferred embodiments, two pairs of lengthy rigid bodies are provided in parallel with each other.

Like the above preferred embodiment shown in FIG. 32, two pairs of lengthy rigid bodies 91 and 92 provide an increased area available for firmly sandwiching roll cargo 7, thus promoting the effect of pressed sandwiching operation and providing improved effect for securely preventing roll cargo from incurring projection and displacement of the inner layers of roll cargo on the way of sea/overland transportations. When implementing this preferred embodiment, by providing each lengthy rigid body with a specific length identical to that of those lengthy rigid bodies used for the above preferred embodiments, roll cargo 7 is subjected to overall sandwiching pressure which is applicable to the portion adjacent to external circumference. This significantly improves the effect of securely preventing roll cargo from incurring projection and displacement of the inner layers of roll cargo on the way of sea and overland transportations.

It should be understood that the invention does not confine the constitution of the apparatus for preventing roll cargo from incurring divergence of roll core only to those constituent components described above, but the invention also allows use of projected parallel pattern or disc pattern for constituting lengthy rigid bodies 91 and 92, and in addition, these lengthy rigid bodies may be folded as required. It is also possible for the invention to use only a piece of leading chain for generating pressed sandwiching force against roll cargo by first covering one of lengthy rigid bodies with the leading chain and then penetrating the other lengthy rigid body. It is also possible for the invention to use bar members for connecting those lengthy rigid bodies and allow interposition of twist locking and/or turn-buckle mechanism as required.

What is claimed is:

1. A roll cargo transporting container comprising;
   top frame member which is removably installed between upper ends of a plurality of main pillar frame members erected on four corners of bottom frame member;
   sliding frame member which is capable of sliding itself in the vertical direction in a range covering upper half of said main pillar frame member; and
   a plurality of bracket members which are provided with arc-shaped surfaces coming into contact with roll cargo, wherein said bracket members are slidably installed to the upper surface of said bottom frame member and the bottom surface of said sliding frame member.

2. The roll cargo transporting container as set forth in claim 1, wherein said main pillar frame member is of square configuration.

3. The roll cargo transporting container as set forth in claim 2, wherein said main pillar frame members are provided with inwardly-oriented projections on the surface of main pillars opposite from each other and wedge means which integrally combines said bottom frame member with said main pillar frame members by being inserted between edges of said bottom frame member and inwardly oriented projections.

4. The roll cargo transporting container as set forth in claim 1, wherein said main pillar frame members are erected and can be laid flat on said bottom frame member.

5. The roll cargo transporting container as set forth in claim 1, wherein said bottom frame member is further provided with a plurality of auxiliary pillar members which are erected while said main pillar frame members remain flat on said bottom frame member.

6. The roll cargo transporting container as set forth in claim 1, wherein said bracket members can removably be installed to the upper surface of said sliding frame member.

7. The roll cargo transporting container as set forth in claim 1, wherein said main pillar frame member is foldable at a specific position close to lower part and further comprising;

an aperture which is at least provided for said main pillar frame member at the portion which allows sliding movement of said sliding frame member;

engaging member which is removable from said aperture and engageable with said sliding frame member; and positioning member which positions said bracket members at predetermined positions.

8. The roll cargo transporting container as set forth in claim 7, wherein said main pillar frame member is of square configuration.

9. The roll cargo transporting container as set forth in claim 7, wherein said main pillar frame member is provided with a plurality of auxiliary pillar members which can selectively be erected.

10. The roll cargo transporting container as set forth in claim 7, wherein further comprising;

ascending and descending member which selects the engaged and disengaged condition of engaging member relative to the ascending and descending movement of said sliding frame member.

11. The roll cargo transporting container as set forth in claim 7, wherein said sliding frame member mounts said bracket members on its upper surface so that bracket members can be removed as required.

12. The roll cargo transporting container as set forth in claim 7, wherein said bracket member is composed of a plurality of foldable plates and provided with sliding guide member on its bottom surface so that said sliding guide member can slidably be engaged with said bottom frame member.

* * * * *